United States Patent [19]
Herbert

[11] Patent Number: 5,777,596
[45] Date of Patent: Jul. 7, 1998

[54] TOUCH SENSITIVE FLAT PANEL DISPLAY

[75] Inventor: Brian K. Herbert, Colorado Springs, Colo.

[73] Assignee: Symbios, Inc., Ft. Collins, Colo.

[21] Appl. No.: 556,689

[22] Filed: Nov. 13, 1995

[51] Int. Cl.[6] ............................................. G09G 3/36
[52] U.S. Cl. ................................... 345/104; 345/173
[58] Field of Search ............................. 345/173, 104, 345/179; 349/19, 33, 34, 37, 39, 41, 64, 112

[56] References Cited

U.S. PATENT DOCUMENTS

| | | | |
|---|---|---|---|
| 4,224,615 | 9/1980 | Penz | 340/712 |
| 4,363,029 | 12/1982 | Piliavin et al. | 340/501 |
| 4,529,968 | 7/1985 | Hilsum et al. | 340/365 C |
| 4,736,191 | 4/1988 | Matzke et al. | 340/365 |
| 5,043,710 | 8/1991 | Rydel | 340/712 |
| 5,194,862 | 3/1993 | Edwards | 341/20 |
| 5,267,066 | 11/1993 | Nakai et al. | 359/67 |
| 5,451,724 | 9/1995 | Nakazawa et al. | 178/20 |
| 5,457,289 | 10/1995 | Huang et al. | 178/20 |
| 5,459,463 | 10/1995 | Gruaz et al. | 341/33 |
| 5,495,077 | 2/1996 | Miller et al. | 178/18 |
| 5,500,937 | 3/1996 | Thompson-Rohrleck | 395/161 |
| 5,510,813 | 4/1996 | Makinwa et al. | 345/173 |
| 5,528,266 | 6/1996 | Arbeitman et al. | 345/173 |

FOREIGN PATENT DOCUMENTS

| | | | |
|---|---|---|---|
| 0546704 | 6/1993 | European Pat. Off. | A61B 5/117 |
| 0568342 | 11/1993 | European Pat. Off. | H03K 17/96 |
| 0622754 | 11/1994 | European Pat. Off. | G06K 11/16 |
| 2662528 | 11/1991 | France | G06K 11/06 |
| 61-156107A | 12/1986 | Japan | G02F 1/133 |
| 6034940 | 5/1994 | Japan | G02F 1/133 |

*Primary Examiner*—Steven J. Saras
*Assistant Examiner*—Vincent E. Kovalick
*Attorney, Agent, or Firm*—Wayne P. Bailey

[57] ABSTRACT

The present invention relates to a touch sensitive LCD flat panel display. The display allows a user to provide input into a computer device by simply touching an LCD display screen with a passive device, such as a finger, stylus, or a ball point pen. The invention includes circuitry which continuously compares the charge times of the liquid crystal elements of the display to a reference value and uses the results of the comparison to determine which elements in the display are currently being touched.

41 Claims, 10 Drawing Sheets

TOUCH SENSITIVE FLAT PANEL DISPLAY

FIELD OF THE INVENTION

The invention relates in general to liquid crystal flat panel displays and, more particularly, to displays which are responsive to the touch of a user.

BACKGROUND OF THE INVENTION

Liquid Crystal Display (LCD) technology has seen widespread use in the computer industry in products ranging from calculators to computer displays. LCDs are capable of producing high contrast images with relatively little power consumption and are much more compact than alternative display devices, such as cathode ray tubes. For these reasons, LCDs are the display device of choice for portable computers. In addition, due to reducing costs and increasing capabilities, LCDs are currently experiencing increased usage with home computer systems.

Also seeing widespread use in the computer industry is a computer input device known as a stylus. A stylus is a pointing device which a computer operator can use to indicate a specific location on a display device to a host computer while performing computer applications. In this regard, a stylus can be used as a replacement for other types of pointing devices, such as mice and track balls. In one application, a stylus can be used in a process known as inking, wherein a user runs the tip of the stylus across the display surface of a display device, such as an LCD, while a host computer simultaneously illuminates the pixels on the display device traversed by the stylus tip. Many other applications also exist.

As is apparent from the above description, a computer system using a stylus has to have some way of sensing the position of the stylus tip on the screen of the display device. A number of approaches have been used in the past to accomplish this. In one approach, a resistive or capacitive sensing membrane is placed over the display screen to sense the location of the stylus. In another approach, the stylus communicates its position to a host computer by transmitting an RF signal to receiver circuitry attached to the display screen. In yet another approach, the stylus transmits position information to a host computer via an electrical cable. The disadvantage of known past approaches is that they either require a special stylus, which may be costly and can be misplaced, or they require special sensing devices attached to the display, which adds to the cost and weight of the product. It would be desirable to have a system in which a common object, such as a ball point pen or an operator's finger, could be used as a pointing device without the need for bulky sensing devices attached to the display.

Therefore, a need exists for a method and apparatus for implementing a stylus in a computer system using an LCD display, which is less expensive, lighter in weight, and more user friendly than past approaches.

SUMMARY OF THE INVENTION

The present invention fulfills the above-mentioned need by providing a touch sensitive LCD flat panel display which takes advantage of the unique properties of liquid crystal display elements to allow a user to provide input into a computer device by simply touching an LCD display screen with a passive device, such as a finger, stylus or a ball point pen. The invention provides all of the pointing capabilities of past stylus designs without the need for a special pen or bulky sensing circuitry.

In conceiving of the present invention, it was appreciated that the capacitance, and therefore the charge time when using a constant current source, of a liquid crystal display element increases when an external touch is applied to the element. In this regard, one aspect of the present invention includes: (a) a plurality of LCD elements, (b) means for applying a charge to each of the elements, (c) means for monitoring a voltage across each of the elements and for using the voltage to compare the charge time of each of the elements to a reference charge time value; and (d) means, responsive to the means for monitoring, for determining which, if any, of the LCD elements in the plurality are being touched. In one embodiment, the invention does the charge time comparison by applying a charge to all of the elements in a row and determining which of the elements have charged up to a predetermined voltage by the time a strobe line is pulsed. In another embodiment, the strobe is pulsed multiple times during a charging cycle resulting in weighted charge time information. In yet another embodiment, a counter is used to time the period for which an element has exceeded a reference voltage as an indication of the charge time of the element.

It was also appreciated in conceiving of the present invention that a condition may exist where the capacitance change of an element is effected more by its neighboring elements than by a touch applied to the element. This condition is caused by the fact that LCDs generally require two relatively thick glass plates to contain the liquid crystal material. Because the glass plates have to be relatively thick for structural purposes, the effect that a touch has on the capacitance of the element is reduced. In this regard, another aspect of the present invention includes: (a) an LCD element including: (I) a front transparent plate having a first surface and a second surface, the first surface having a front electrode disposed adjacent thereto; (ii) a rear transparent plate positioned substantially parallel to, and in fixed relation to, the front transparent plate, the rear transparent plate having a rear electrode disposed adjacent to a second surface thereof, the first surface of the rear transparent plate facing the first surface of the front transparent plate so that the front electrode is substantially opposite the rear electrode; and (iii) a layer of liquid crystal material between the first surface of the front transparent plate and the first surface of the rear transparent plate, the layer capable of changing optical properties when a predetermined voltage is applied across the front and rear electrodes; (iv) wherein the LCD element has a capacitance between the front and rear electrodes which changes when a user touches the second surface of the front transparent plate; (b) means for determining whether the surface of the front transparent plate is being touched by a user based on the change in capacitance; and (c) means, operatively connected to the front transparent plate, for increasing the change in capacitance of the LCD element when the second surface of the front transparent plate is touched by a user so that the means for determining is more sensitive to the touch of a user. In one embodiment, the means for increasing includes a means for diffusing a conductive material into the front transparent plate adjacent to the front electrode. In another embodiment, the means for increasing includes a means for embedding the front electrode into the front transparent plate. In yet another embodiment, a resistive material is diffused in the transparent plate, allowing limited current flow between the electrode of the display element and an external stylus or finger.

In most applications, it is desired that an image be displayed on an LCD at substantially the same time that touches to the LCD screen are being monitored. Because the display of an image requires that a predetermined voltage be maintained on the elements of the display (including typically zero volts for black or non-illuminated pixels), it is impossible to constantly charge and discharge every element in the display to sense touches to the screen. In this regard, a third aspect of the present invention includes: (a) means for alternately charging and discharging the display elements in a subgroup of the display elements in a display screen; (b) means for comparing a charge time of each of the display elements in the subgroup to a reference charge time value; and (c) means for processing the results of the comparison to determine which, if any, of the display elements in the subgroup are being touched; wherein the display elements in the display screen which are not in the subgroup continuously display an image on the display screen. In one embodiment, the subgroup of display elements produce a blinking cursor on the display screen. In another embodiment, the subgroup of display elements comprises a row of display elements on the display screen. This row may be periodically changed so that every row of the display screen is periodically scanned.

DETAILED DESCRIPTION

The present invention relates to a touch sensitive LCD flat panel display. The display allows a user to provide input into a computer device by simply touching an LCD display screen with a passive device, such as a finger, stylus, or a ball point pen. The invention includes circuitry which continuously compares the charge times of the liquid crystal elements of the display to a reference value and uses the results of the comparison to determine which elements are currently being touched.

Before the invention is described, a short discussion of the operational characteristics of a liquid crystal display (LCD) will be made. Liquid crystal displays are possible because of the unique ability of liquid crystal materials to control the transmission of light from an external source in response to an electrical signal. Therefore, all LCDs include both a thin layer of liquid crystal material and a means for delivering electrical signals to the material to change its optical properties.

Figure 1:
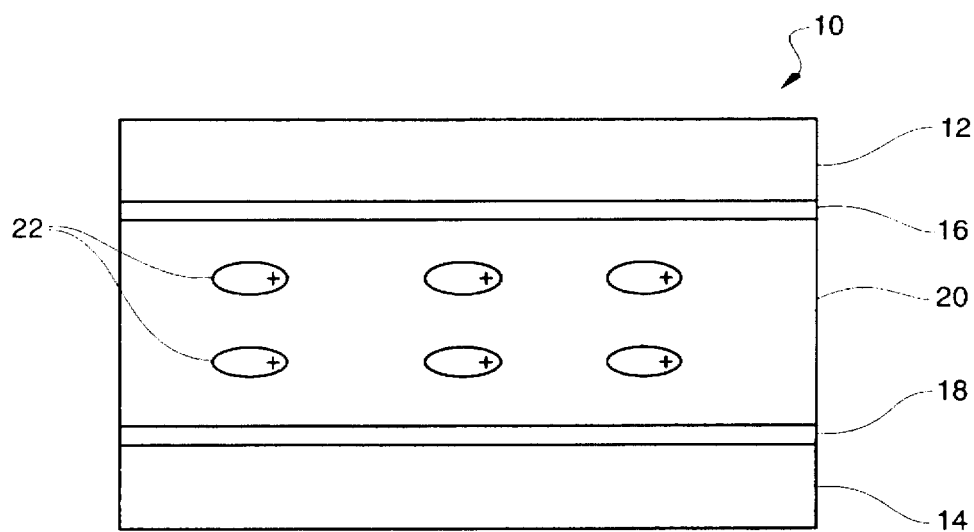
FIG. 1 is a sectional view of a typical LCD element.

FIG. 1 is a sectional view of a typical liquid crystal display element 10. As seen in the figure, the element 10 includes: front glass 12, rear glass 14, front electrode 16, rear electrode 18, and liquid crystal layer 20. The front and rear glass 12, 14 are flat, transparent elements which are used to contain the thin layer of liquid crystal material 20 and to provide a substrate for deposition of the electrodes 16, 18. The electrodes 16, 18 are operative for supplying the electrical signals to the liquid crystal material to change the optical properties of the material. The electrodes 16, 18 are normally made of a transparent conductive material which can be easily deposited on the inside surface of the corresponding glass piece 12, 14. Because the liquid crystal display element includes two electrodes separated by a dielectric material, it behaves electrically much like a capacitor. That is, when a voltage is provided across the two electrodes, the element "charges up" to the applied voltage level.

The liquid crystal material comprising the liquid crystal layer 20 is made up of electrically polar molecules 22 which orient themselves according to the electric field emanating from the electrodes. Because the molecules are optically and physically anisotropic, the optical properties of the liquid crystal material, as viewed from a stationary reference point, change as the molecules reorient themselves with the electric field. In general, the potential difference across the thin layer 20 must exceed a specific RMS threshold voltage before any change in optical properties is apparent.

In a typical LCD, a multitude of elements 10 are arranged in an array pattern which allows a wide variety of display images to be displayed. When an LCD having a large array of display elements is being utilized, a problem arises in how to address each element in the array in order to create a desired display image. In this regard, two different types of LCD arrays, each using a different type of addressing, have been developed. It should be appreciated that the present invention can be used with either type of LCD array.

In the first type of array, known as a passive display, all of the front electrodes in each row (or column) are connected to a common row bus and all of the rear electrodes in each column (or row) are connected to a common column bus. (Alternatively, a passive display may divide the array into a number of regions for which all of the front electrodes in each row of each region are connected to a common row bus, etc.) To address a particular display element in the array, a positive voltage is applied to the appropriate row bus and a negative voltage is applied to the appropriate column bus (or vice versa) so that a composite RMS voltage exceeding the threshold voltage is applied across the selected element. To ensure that non-selected elements are not inadvertently addressed, neither the positive nor the negative voltage described above should exceed the threshold voltage alone. This process of applying voltages to busses, known as multiplexing, can be repeated until all of the elements in the display have been addressed. As the number of elements addressed by a common row or column line is increased, the voltage difference between 'on' and 'off' pixels decreases, thereby reducing contrast.

A second type of LCD array is known as an active matrix display. An example of this type of array can be seen in FIG. 2. An active matrix display includes a separate electronically controlled switch 24 at each LCD element 26. This switch 24, for example, may take the form of a MOS thin film transistor (TFT) deposited adjacent to the corresponding element on the glass substrate. The switches may be turned on and off by applying a voltage to or removing a voltage from a control terminal 28. If a MOS device is being used, for example, the control terminal 28 is the gate terminal of the MOS device.

Figure 2:
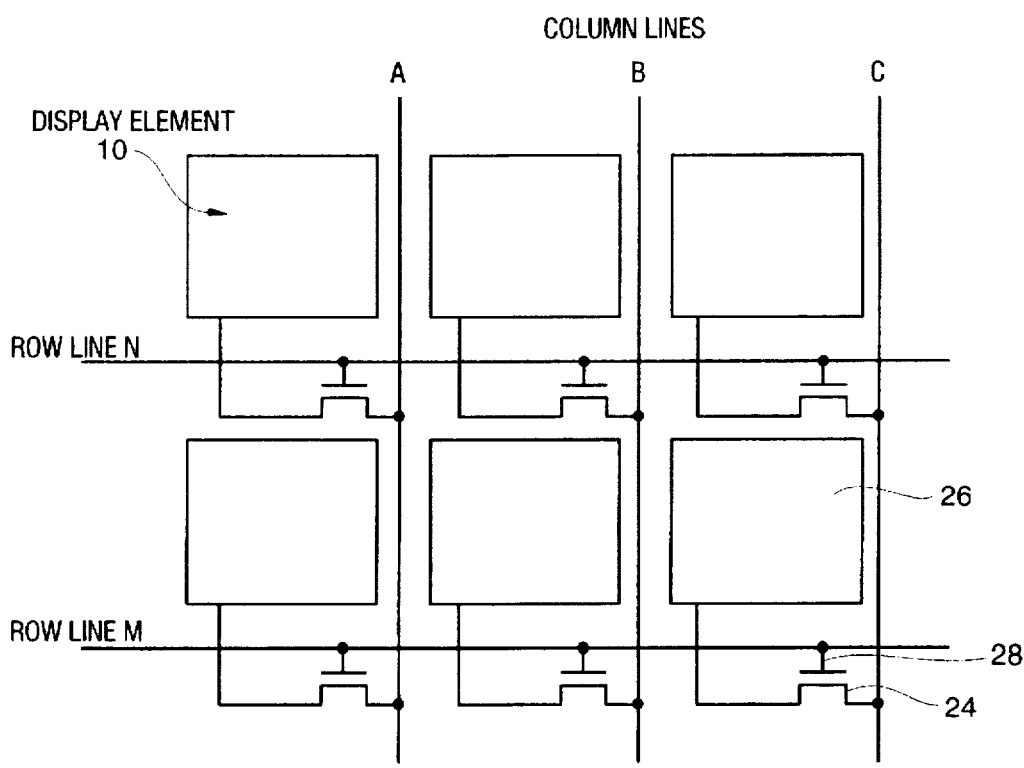
FIG. 2 is a schematic diagram illustrating a portion of a typical active matrix liquid crystal display.

In a typical active matrix display, all of the switch control terminals 28 associated with a particular row of the array are connected to a common row bus, such as Row Line M in FIG. 2. When a voltage is applied to this row bus, each of the elements in that particular row are connected to a corresponding column bus. Voltages may then be delivered to each of the elements in the selected row, via the corresponding column busses, to set the desired display state of each of the elements. The display voltages may be delivered to the display elements one column at a time or, more preferably, all at the same time. A separate display control unit (not shown) synchronizes the delivery of display voltages to the display elements to create the desired images. The display control unit may include, for example, a microprocessor or sequencer for controlling the operation and timing of the elements, a display memory for storing display data for the entire array, and a line buffer for storing and transferring voltage select signals for the selected row of the display. Because the voltage level applied to the corresponding column bus of a display element in an active matrix display is not limited like it is for a passive display, a wide range of voltages may be applied to the column bus and variable intensities may be achieved.

As was discussed previously, the display elements of a liquid crystal display behave like capacitors. As is well known in the art, the charge time of a capacitive circuit is related to the capacitance of the circuit. Therefore, measuring the relative charge time (or discharge time) of the display elements is an indirect method of measuring the relative capacitance of the elements.

Because of loading effects, among other things, the electrical characteristics of an LCD element will change when an object, such as a ball point pen or a person's finger, is brought close to one of the electrodes. This will occur, for example, when a user touches the surface of an LCD display screen. For convenience, the balance of the specification will refer to an object such as a passive stylus which changes the capacitance of an LCD display element, when brought in contact with the display surface. Because the capacitance of an LCD element changes when touched, the charge time of the element will change accordingly. The present invention periodically compares the charge (or discharge) time of each element in an LCD array to a reference value and uses the result of the comparison to indicate which of the display elements in the array is currently being touched by the passive stylus. As will be described in more detail, a number of different methods for comparing charge times may be used in accordance with the present invention.

Figure 3:
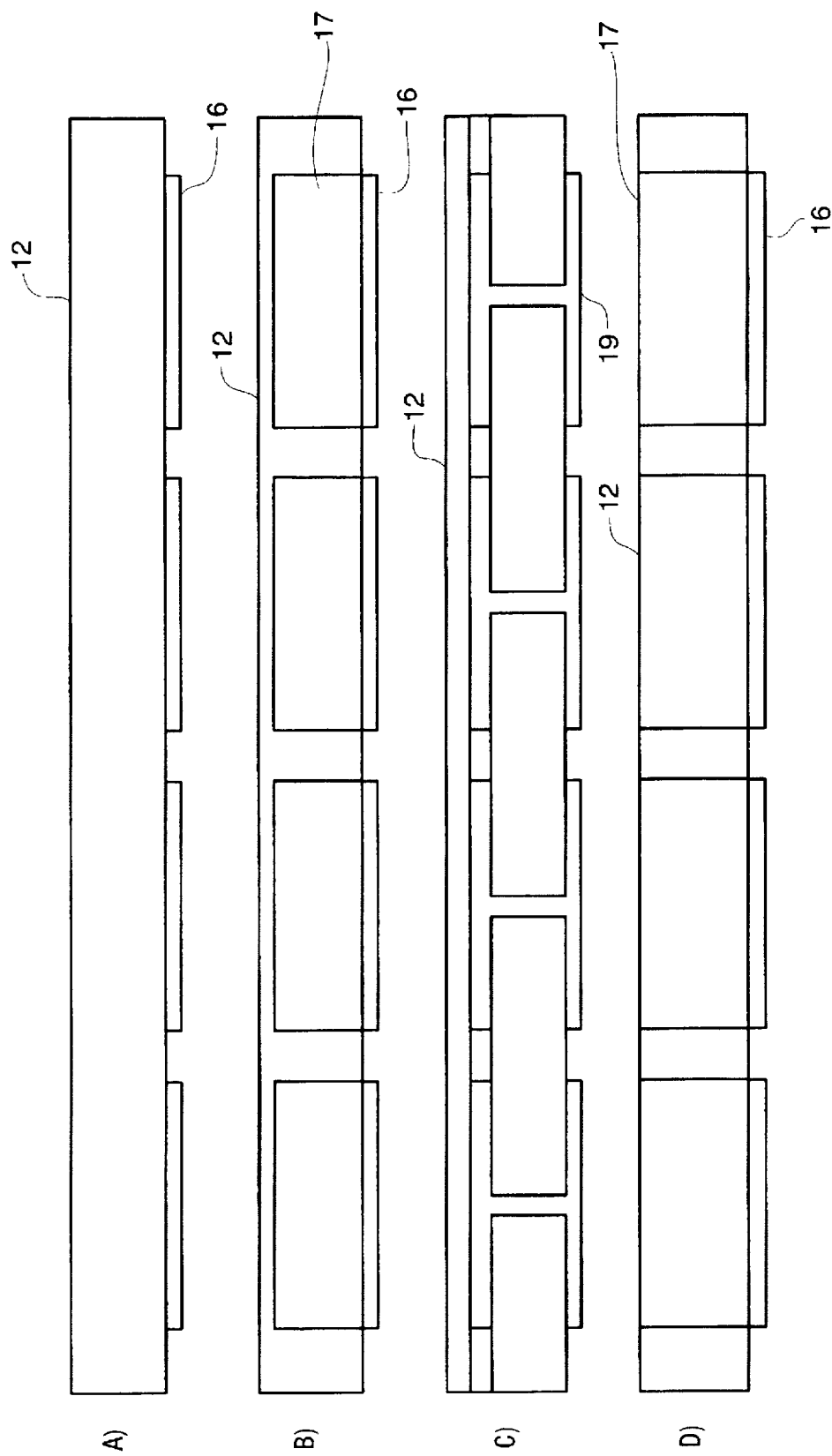
FIG. 3 is a sectional view of different glass structures which may be used in accordance with the present invention.

In a display element such as the one illustrated in FIG. 1, the thickness of the glass may result in a condition such that neighboring display elements have a larger contribution to sensed capacitance changes than does the presence of additional capacitance on the other side of the glass or that the capacitance of the interconnecting wires is much greater than that of the display element. The thickness of the glass may be required, however, to provide structural rigidity. In one aspect of the present invention, as illustrated in FIG. 3, various glass structures are provided which accommodate the above-mentioned conditions by effectively reducing the thickness of the glass as sensed by the display elements, while maintaining the required structural rigidity. FIG. 3(a) illustrates a typical top panel glass having associated electrodes 16. FIG. 3(b) illustrates a similar structure with the addition of an area 17, located above each electrode 16, diffused with a conductive dopant material. This diffused area 17 effectively moves the segment electrodes 16 close to the surface of the display, making it possible to sense the presence of a passive stylus above the glass 12 with much greater accuracy. FIG. 3(d) takes the above approach one step further by having the diffused area 17 extend completely through the glass 12. This approach supports resistive coupling between the electrode 16 and the passive stylus and, therefore, is extremely sensitive to touching. FIG. 3(c) illustrates a glass structure having an electrode 19 which is partially embedded in the glass. This structure is similar in effect to the structure of FIG. 3(b), but uses a metalized rather than diffused approach.

Figure 4:
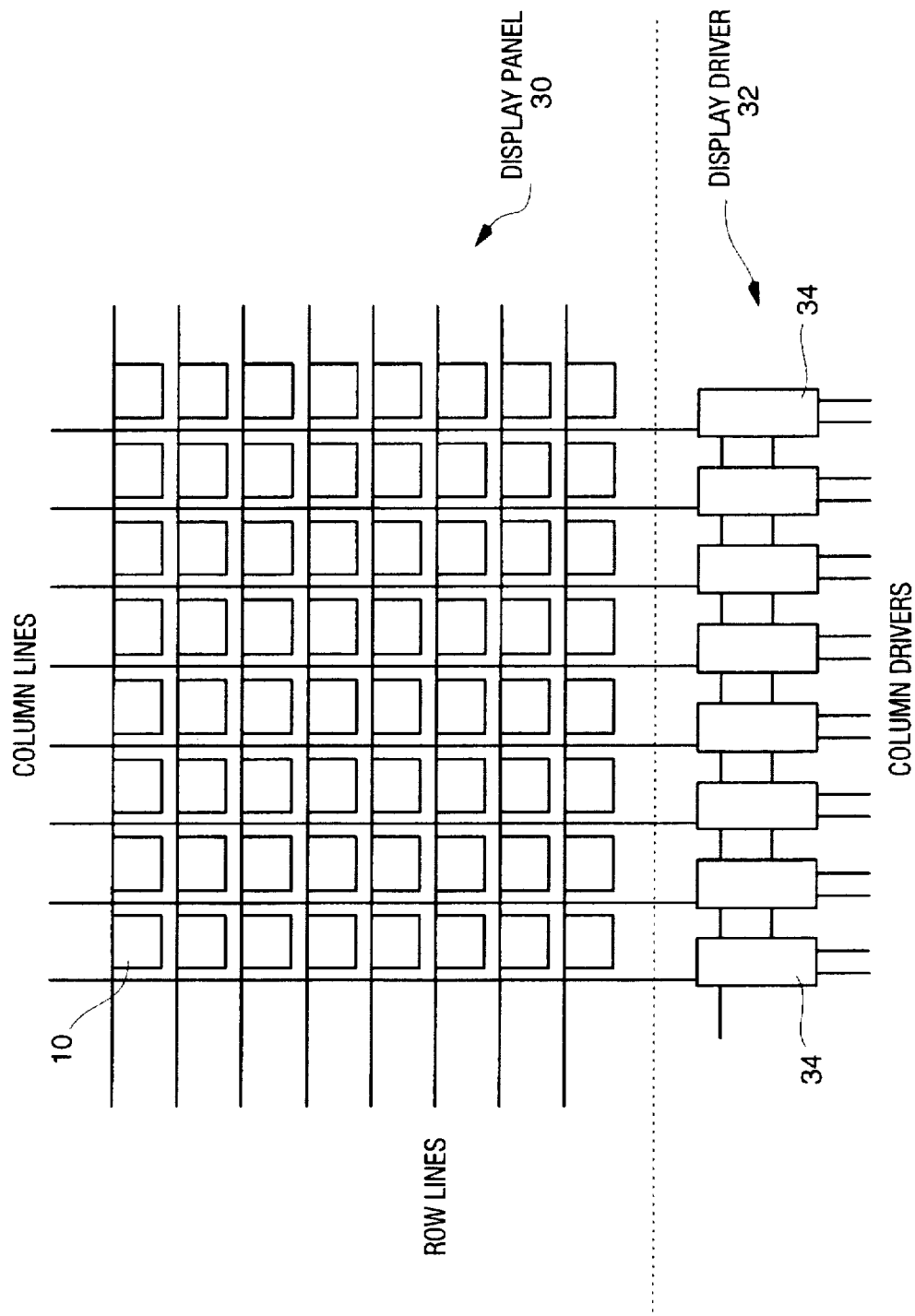
FIG. 4 illustrates one embodiment of the display system of the present invention.

FIG. 4 illustrates one embodiment of an LCD system in accordance with the present invention. The apparatus of FIG. 4 includes a display panel section 30 and a display driver section 32. Both of these sections are controlled by an external display control unit which is not shown in the figure. In the preferred embodiment of the present invention, the display panel section 30 comprises an active matrix array and, therefore, the following discussion will be with respect to such an array. It should be understood, however, that, as discussed previously, the invention is equally applicable to passive arrays.

Figure 5:
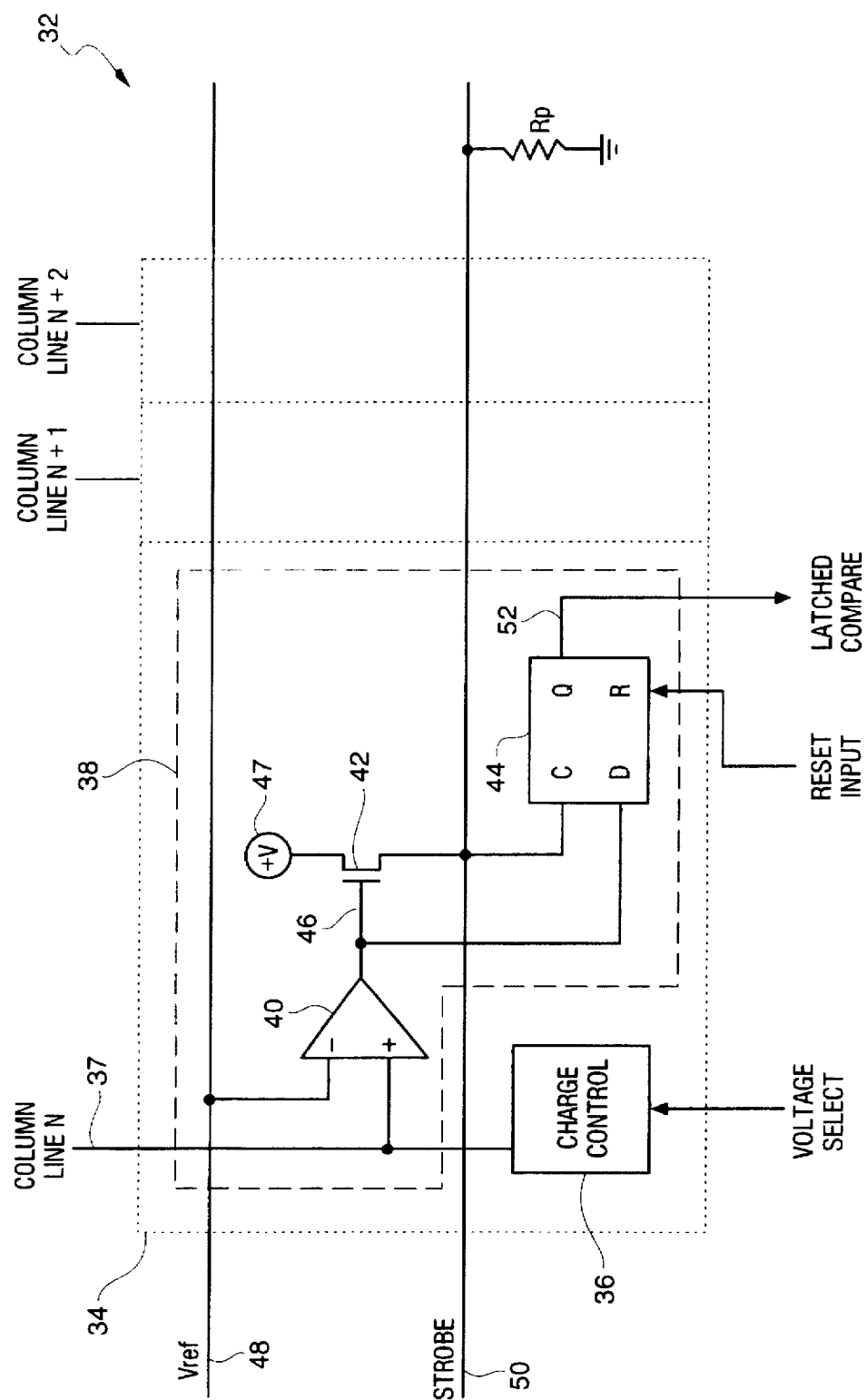
FIG. 5 illustrates one embodiment of the display driver circuitry of FIG. 4.

The display driver section 32 includes a plurality of column driver units 34, one unit being connected to each column line in the array. FIG. 5 is a block diagram illustrating one embodiment of the column driver units of FIG. 4. As seen in FIG. 5, each column driver unit 34 may include a charge control unit 36 and a charge time measurement and comparison unit (CMCU) 38.

The charge control unit 36 is operative for sourcing or sinking current until a specific voltage is attained on a corresponding column line 37 in response to a voltage select signal from a display control unit (not shown). Once on the column line 37, the charge control unit acts upon whichever display element 10 in that column is electrically connected to the column line 37 through the corresponding electronically controlled switch 24 (i.e., the selected display element). The display control unit (not shown) controls which display element is connected to the column line 37 by delivering a voltage to the appropriate row line.

Figure 6:
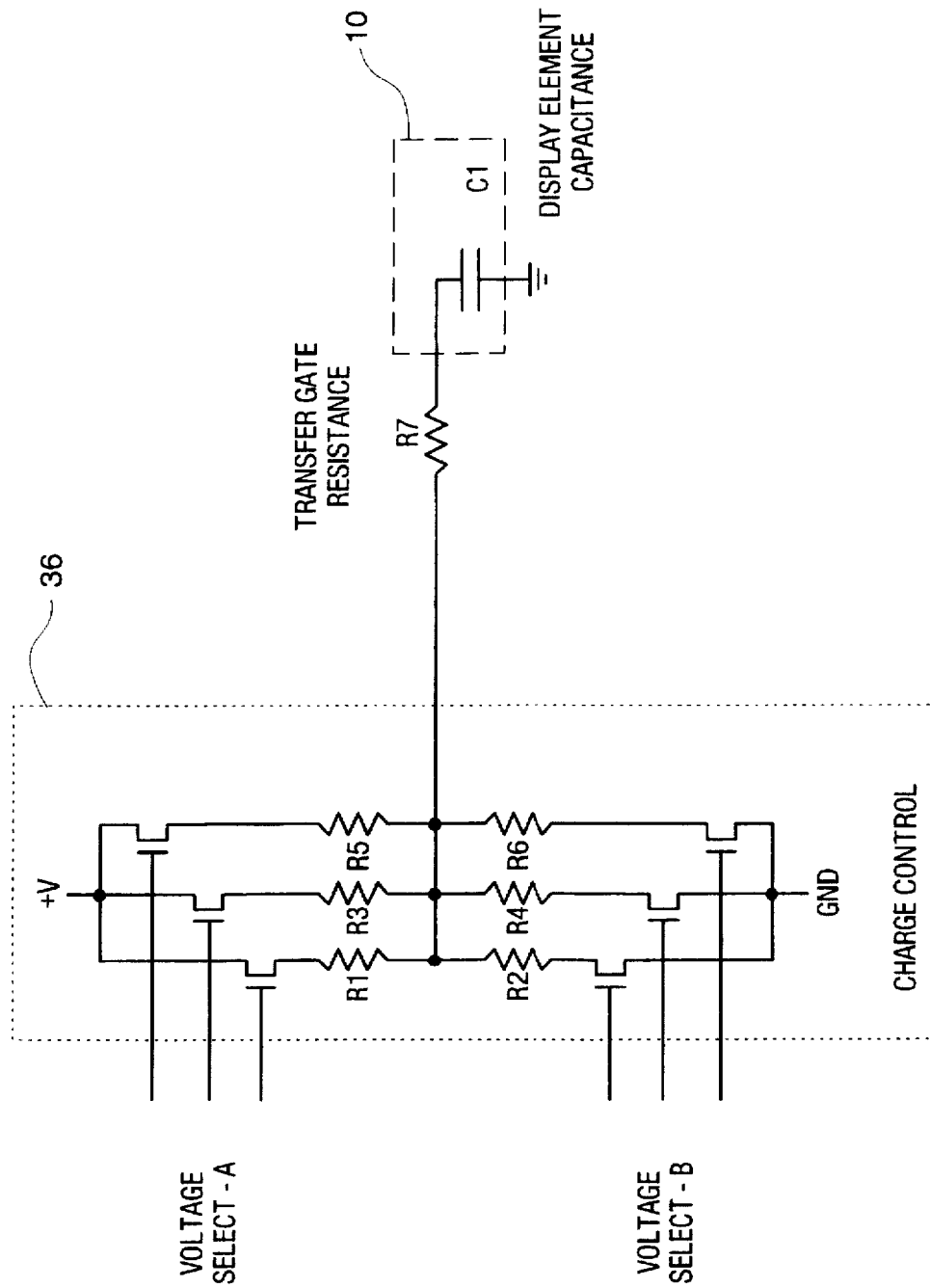
FIG. 6 illustrates one embodiment of the charge control unit of FIG. 5.

The level of the voltage applied to the selected display element by the charge control unit 36 depends upon the display state which the display control unit determines that the element should be displaying. If variable intensities are being used, the applied voltage can take any one of a number of different values. For example, FIG. 6 illustrates one embodiment of a charge control unit 36 which may be used in the present invention to supply current, reaching one of a number of voltages, to a selected display element 10. The unit 36 receives Voltage Select A and Voltage Select B signals from the display control unit and delivers a corresponding current and voltage to the display element 10 based on a chosen voltage division of a reference voltage, v.

The CMCU 38 is operative for comparing the charge time of the selected display element to a reference value, Vref, and for creating an output signal indicative of the result of the comparison. It should be understood that many different methods of comparing charge times may be implemented in accordance with the present invention and the embodiment illustrated in FIG. 5 represents only a single way of accomplishing the comparison.

In the embodiment of FIG. 5, each CMCU 38 includes: a comparator 40, a switch 42, and a data latch 44. The comparator 40 has a positive input terminal connected to a corresponding column line 37 and a negative input terminal connected to a reference voltage line 48. As illustrated in FIG. 5, a single reference voltage line 48 services all of the CMCUs 38 in the apparatus. The output of the comparator 40 is connected to a switch control terminal 46 of switch 42 for controlling the electrical connection between a voltage source 47 and a strobe line 50. The strobe line 50 is connected to the clock terminal of the data latch 44 in every CMCU 38 in the display driver section 32. The output of the comparator 40 is also connected to the data input of data latch 44. Data latch 44 has a latched output terminal 52 which may be connected to the display control device (not shown) and a reset input terminal which may receive commands from the display control device.

The circuitry of FIG. 5 operates as follows. Charge control unit 36 supplies current to column line 37 which begins to charge up the selected display element in the corresponding column. The comparator 40 monitors the voltage present on the column line 37 and outputs a logic high signal if and when this voltage exceeds the voltage on reference voltage line 48, i.e., Vref. It should be appreciated that the reference voltage, Vref, used in this embodiment, and all other embodiments of the present invention, may be adjustable. The logic high signal at the output of comparator 40 turns on switch 42 which connects voltage source 47 to the strobe line 50. This connection causes the data latches 44 in every CMCU 38 in the display driver section 32 to clock and, therefore, to latch the value currently present at their data inputs to their respective latched output terminals 52. Therefore, every CMCU 38 for which the voltage on the respective column line 37 had exceeded the reference voltage at the time the data latches 44 were clocked will output a logic high signal at its latched output terminal 52 while all other CMCUs 38 will output a logic low. These output signals are indicative of the relative charge times of the selected elements with respect to one other.

Figure 8:
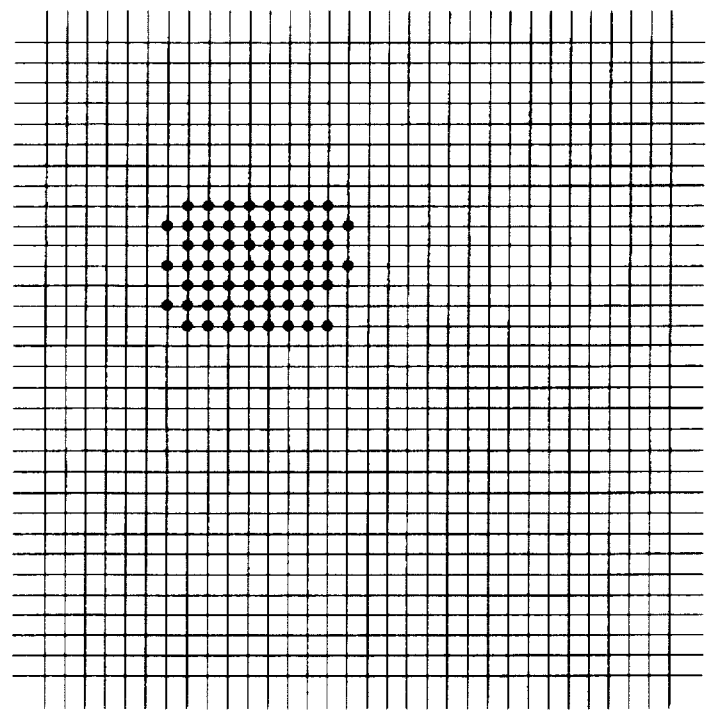
FIG. 8 is a charge time plot illustrating the relative charge times of the display elements in an LCD display, which can be created using one embodiment of the present invention.

The above comparison process may be repeated for each row in the display panel section 30. The data output from the latched output terminals 52 of the data latches 44 for each row of the display panel section 30 can then be delivered to the display control device (not shown) so that a representation can be made illustrating the relative capacitance of each display element 10 in the display panel section 30. Such a representation is illustrated in FIG. 8. In FIG. 8, each intersection of a row line and a column line represents a single display element 10. The dark spots in the array represent display elements which have relative charge times longer than those of the other elements and thus indicate that the element has a higher capacitance, i.e., the element is probably being touched by a passive stylus.

Figure 7:
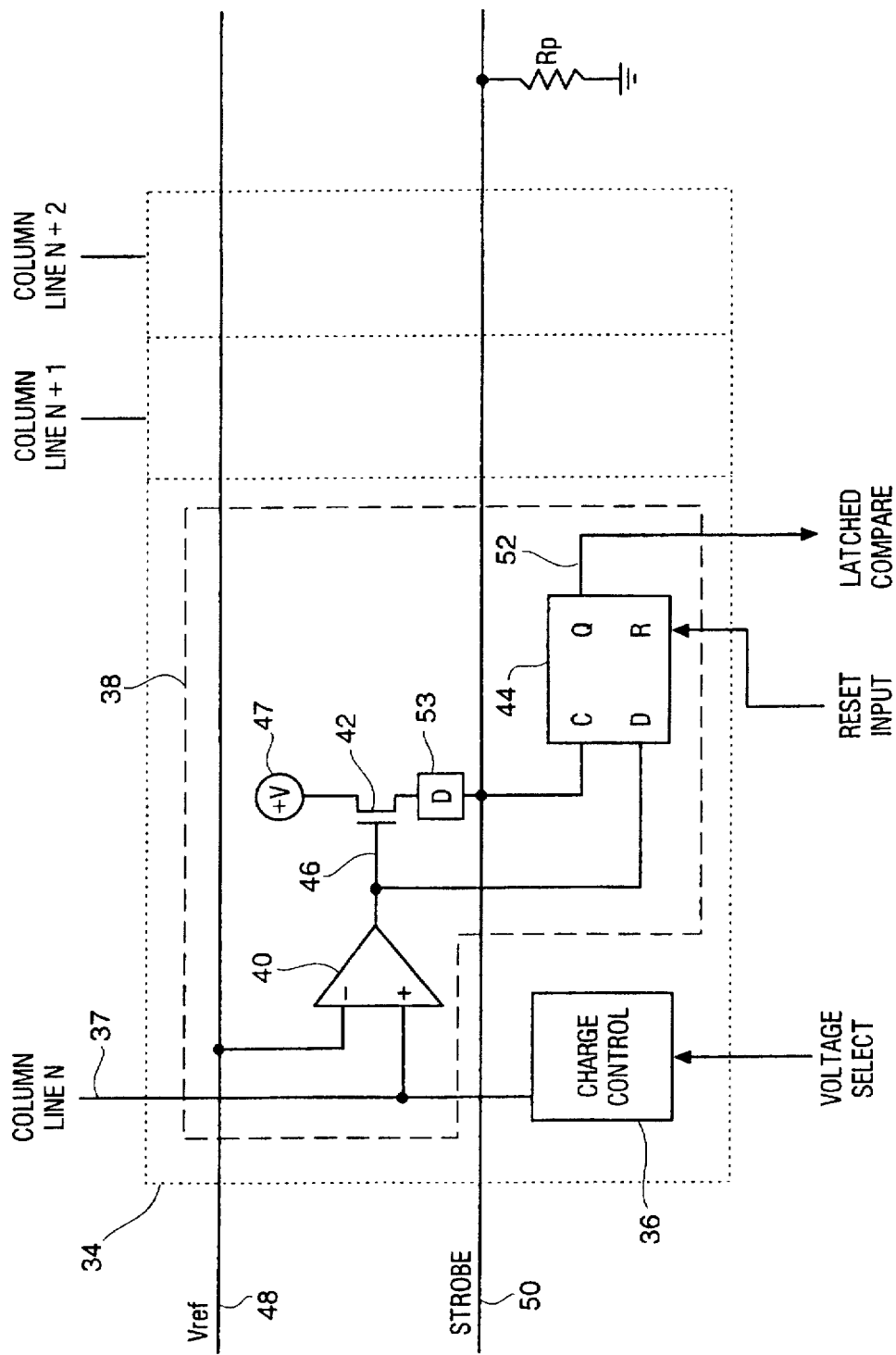
FIG. 7 illustrates another embodiment of the display driver circuitry of FIG. 4.

In the embodiment of FIG. 5, the first column line 37 to exceed the reference voltage is the one which causes a voltage to be applied to the strobe line. Because there is little delay between the time when the reference voltage is first exceeded and the time when the data latches 44 are clocked, only a few of the fastest charging display elements will normally reach the reference voltage by the time the data latches 44 are clocked and thus produce a logic one at the latched output terminal 52 of their respective CMCU 38. In general, it is desired that most of the display elements 10 reach the reference voltage by the time of latching so that an indication is made as to which of the data elements 10 in the selected row charge the slowest and thus represent elements which are probably being touched. Therefore, in a variation of the embodiment of FIG. 5, as illustrated in FIG. 7, a delay element 53 may be inserted between the switch 42 and the strobe line 50. This delay element 52 delays the application of the voltage to the strobe line 50 after the switch 42 is turned on and, therefore, allows a larger number of column lines 37 to exceed the reference voltage before the data latches 44 are clocked. This delay, which can be made variable, provides a means to compensate for inherent differences in charge time between data elements due to, among other things, manufacturing nonuniformities and also provides a means for tuning the display device based on such things as the type of passive stylus being used.

In another variation of the embodiment of FIG. 5, the strobe line 50 is incapable of clocking the data latches 44 until a predetermined number of CMCUs 38 are driving the line 50. This has substantially the same effect as the delay element 52 described above in that a larger number of column lines are allowed to reach the reference voltage before the data latches are clocked.

Figure 9:
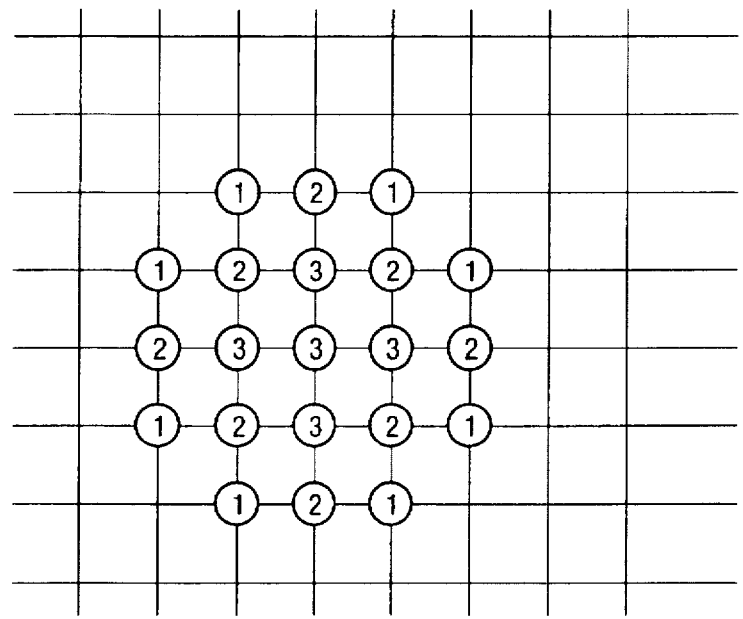
FIG. 9 is a weighted charge time plot illustrating the relative charge times of the display elements in an LCD display, which can be created using another embodiment of the present invention.
Figure 10:
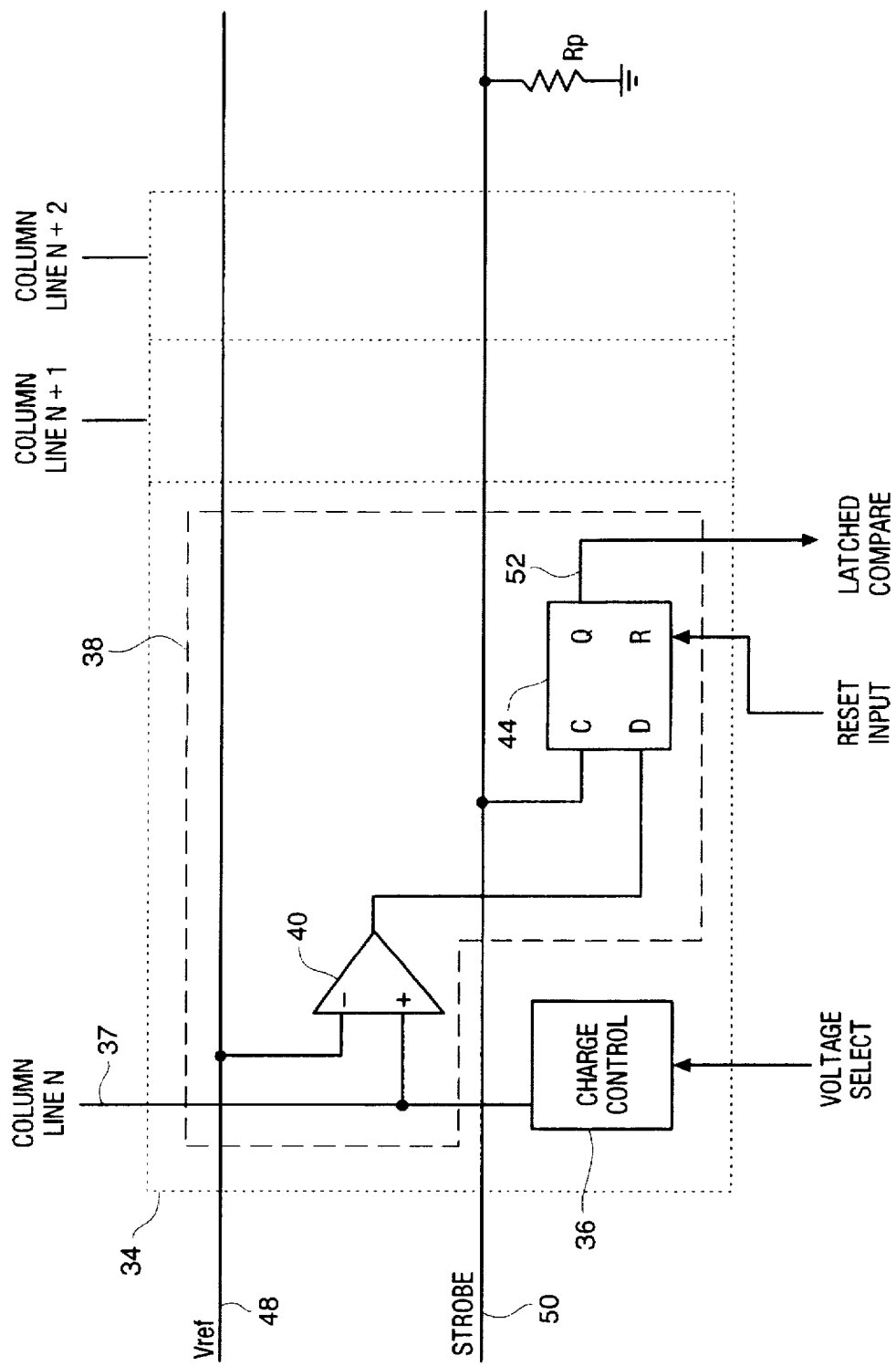
FIG. 10 illustrates another embodiment of the display driver circuitry of FIG. 4.

In another embodiment of the present invention, as illustrated in FIG. 10, an externally generated strobe signal is input onto strobe line 50 from an external source such as the display control device (not shown). The external strobe signal may be created in a number of different ways. In one approach, the strobe signal is created based on a predetermined delay with respect to the time when the charge control units 36 are enabled. In other words, a logic high signal is applied to the strobe line 50 a predetermined period of time after the charge control units 36 apply voltages to their corresponding column lines 37. In a similar approach, the strobe line 50 may be pulsed multiple times during the charging of the display elements. This approach allows a weighted charge time representation to be created, such as the one illustrated in FIG. 9. The weighting numbers shown in the figure correspond to the particular strobe pulse for which the labelled display element first exceeded the reference voltage. This approach allows multiple levels of capacitance change to be inferred from the weighting numbers. This approach also provides for the accommodation of manufacturing variations in charge time by allowing the weighted charge time map to be compared with a previously created charge time map so that display elements which, for example, change from a "2" to a "3" can be identified as having increased loading, i.e., they are being touched.

In another approach, the external strobe signal is created using a reference display element which is substantially shielded from external capacitive influence. This reference display element is used to determine when a "standard" display element should reach a predetermined voltage if it not currently being touched. A voltage is applied to the reference display element at the same time that the voltage is applied to the column lines by the charge control units 36. When the reference display element charges up to the predetermined voltage, the strobe line 50 is pulsed and, accordingly, all of the data latches 44 are clocked. The predetermined voltage may be the same as the reference voltage, Vref. Use of the reference display element approach provides a means for compensating for adverse temperature effects which may effect the accuracy of the invention. As described above with respect to the internally generated strobe signal, a delay may be added to the external strobe signal before it reaches the strobe line 50 so that a larger number of display elements reach the reference voltage before the data latches 44 are clocked. Alternatively, a higher predetermined voltage may be chosen.

Figure 11:
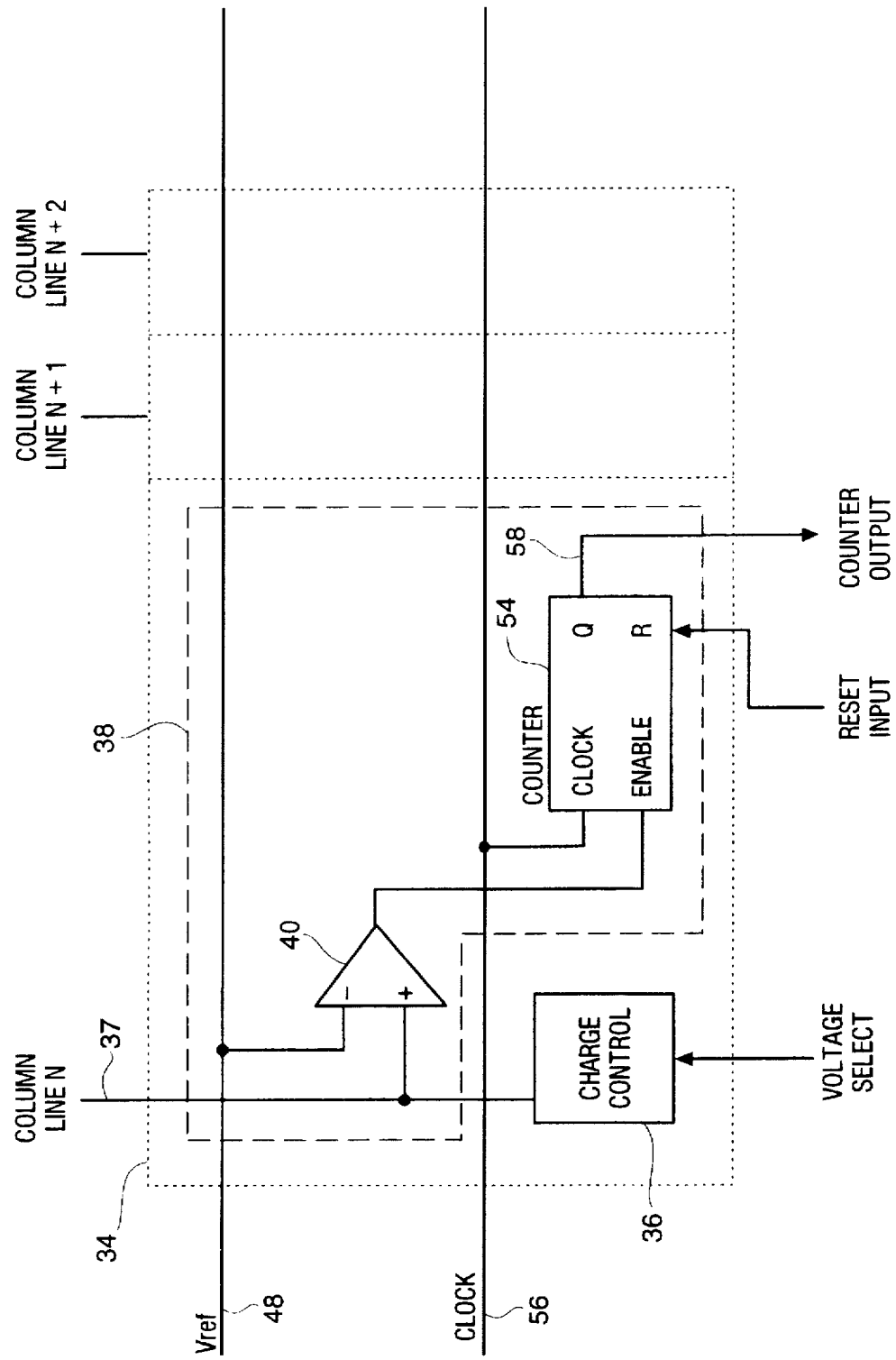
FIG. 11 illustrates yet another embodiment of the display driver circuitry of FIG. 4.

In yet another embodiment of the present invention, as illustrated in FIG. 11, the data latch 44 in each of the CMCUs 38 is replaced by a counter 54. A single clock line 56 carrying an externally generated clock signal drives all of the counters 54 in the display driver section 32. When the voltage on a column line 37 exceeds the reference voltage, the corresponding counter is enabled and begins to count the clock pulses. At the end of a charging cycle, the count 58 contained in each of the counters represents the duration for which the associated display element 10 has surpassed the reference voltage. This data may then be used to create a weighted charge time representation such as the one illustrated in FIG. 9.

As described above, after the charge time comparison data is created by the CMCUs 38, it may be delivered to the display control device (not shown) for processing by controlling software. The following are examples of processing which may be performed in conjunction with inking operations. If the comparison data shows an increased capacitance over a large area of the LCD screen, such as may be created by a user inadvertently placing the palm of his hand over the screen, the group of data resulting from this occurrence can be rejected by the controlling software. If only a few display elements show an increase in capacitance, the controlling software can elect to illuminate one or more pixels at the center of the group depending on line thickness settings. Controlling software may also accommodate errant pixel data that may result from changes in operating conditions or from manufacturing variation. Software may also be used to "fill in" missing pixels when the rate of movement of the stylus tip is such that more than one pixel position is traversed between position sensing periods.

As discussed previously, to create an image on an LCD screen, appropriate voltages must be delivered to each of the elements in the display. If variable intensities are being used, these voltages can take any one of a plurality of different values. Because the display elements have to be at specific voltage levels to create desired images, a method must be provided by which elements may be charged or discharged in accordance with the present invention without destroying the image being displayed. In one embodiment, a blinking line approach is used. The display control device causes a blinking line to progress from the top of the screen to the bottom of the screen in a periodic fashion. The blinking line simply represents the switching of all of the display elements in a given row between a fully charged display state and a fully discharged display state. When the blinking line reaches a certain row, the necessary comparisons are made and charge time comparison data is created. After the blinking line passes the row, the appropriate display voltages may be returned to the display elements in the row and the charge time comparison data may be delivered to the display control device for processing.

In another embodiment, a hot spot cursor approach is utilized. In this approach, a blinking symbol, such as a small dot, is present somewhere on the LCD screen when a corresponding operating mode is enabled. When a user wishes to point to something on the screen, he simply touches the blinking symbol and drags it to the desired location. The system detects the touch on the blinking dot and thereafter tracks the movement of the touch until the touch is removed. The hot spot cursor approach may also be used to perform inking. In an inking application, a user first touches the blinking dot and drags it to the location where inking is to begin. The user then momentarily removes his finger from the blinking dot to indicate that drawing is to begin and then reapplies his finger to the dot and begins drawing. In this way, a specific touch sequence can be used to emulate a common input parameter, such as the pressing of a mouse button. When the user completes a line, he again removes his finger from the dot to indicate that the line is completed. The process may be repeated numerous times to create a desired image. The hot spot cursor approach may be used in a wide variety of different stylus applications.

It is well known in the art to periodically reverse the polarity of the voltages applied to the display elements in an LCD display, such as the one illustrated in FIG. 3, to avoid migration of the liquid crystals toward one of the two electrodes. Therefore, in another embodiment of the present invention, these polarity reversals are used to make the required charge time comparisons. For this embodiment to be operative, however, the reversals have to occur relatively frequently for the invention to be able to detect touches which may occur at any time.

In general, liquid crystal display elements are relatively slow to orient in response to an applied voltage. Therefore, if the process for sensing increased capacitance requires that the LCD elements fully orient, a long sampling time will result. In other embodiments of the present invention, such as the hot spot cursor approach, the LCD elements are driven to a full "on" condition during sensing. In another embodiment of the present invention, which will now be described, sensing is accomplished without having to drive the LCD elements to a fully "on" condition. This embodiment allows sensing to be done much more quickly and, therefore, supports operation with variable intensity pixels without the need for a hot spot cursor.

Figure 12:
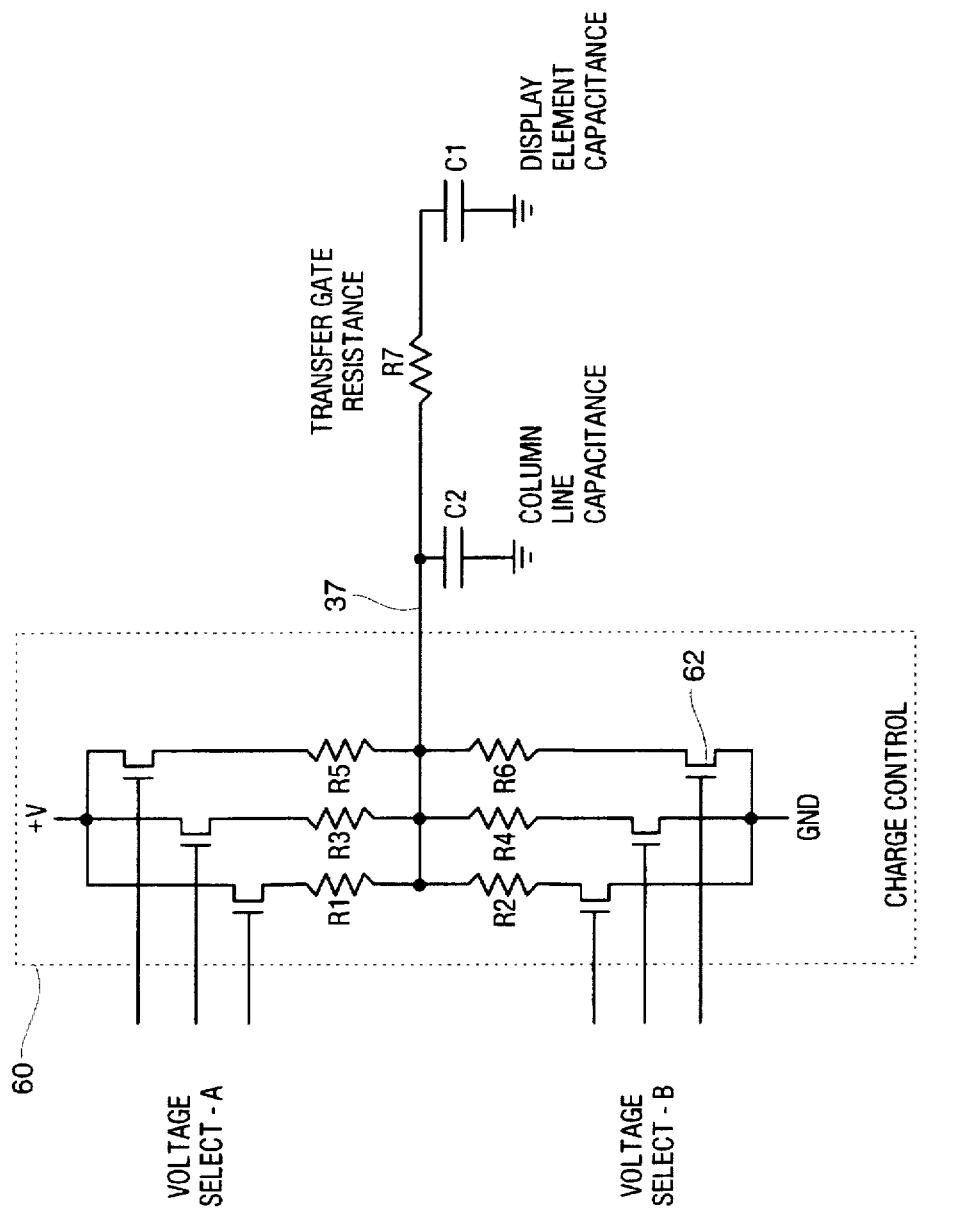
FIG. 12 illustrates a charge control unit for use in another embodiment of the present invention.

FIG. 12 illustrates a charge control unit 60 which may be used in connection with the present embodiment. The charge control unit 60 includes a grounding switch 62 which provides a means for grounding the column line 37. In operation, the charge control units 60 of the present embodiment ground all column lines for a discharge duration, T1, and then apply the same voltage to all column lines through equal resistances for a charge duration, T2. The charge duration is chosen to allow a number of the LCD elements to exceed the reference voltage, Vref, and may be controlled through the sensing of the voltage on one or more of the column lines. In a highly flexible approach, the discharge duration, charging resistance, and charge duration may be controlled by programmable means. The discharging and charging of the LCD elements of the present embodiment may be performed just prior to the refresh cycle of the LCD elements. Because the present embodiment allows sensing to occur in a relatively short time period, changes to the display caused by the sensing, which might otherwise be noticeable to a user, are greatly reduced.

In a variation of the above-described embodiment, the grounding switch 62 is replaced by a coupling switch which allows all of the column lines to be connected together for a duration long enough that all of the column lines reach a like voltage. This variation reduces the occurrence of surge currents through the ground terminal and also reduces total power consumption.

It should be appreciated that the passive stylus of the present invention may include any object capable of changing the charge time of an LCD element. In one embodiment, the stylus may include a specialized unit which is capable of delivering additional data, such as tip switch or barrel switch condition or other data, to the host computer via an alternate method of transmission, such as an RF, ultrasonic, or infrared link. The additional data may then be used by the host computer, in conjunction with the touch input information, to perform applications. For example, the angle of the pen with respect to horizontal may be detected and transmitted as an infrared encoded signal, allowing the application to vary line type or width in drawing applications.

Although the present invention has been described in conjunction with its preferred embodiments, it is to be understood that modifications and variations may be resorted to without departing from the spirit and scope of the invention as those skilled in the art readily understand. For example, the CMCU circuitry of the present invention may be implemented on the glass substrate in proximity to the display elements rather than being located in the driver circuitry. Additionally, the described methods of sensing touching of elements through charge time sensing may be implemented through sensing of discharge times for display elements. References to charge time sensing and measurement described herein encompass both charging and discharging implementations. The term 'applying a charge' is defined to include both sourcing and sinking of current. The term 'charge cycle' also includes discharging cycles. References to 'exceeding a reference voltage' shall imply a more positive voltage is attained when a current is being sourced to the display element and shall imply a more negative voltage when current is being sunk from the display element. Such modifications and variations are considered to be within the purview and scope of the invention and the appended claims.

What is claimed is:

1. A touch sensitive liquid crystal display (LCD) system comprising:

a plurality of LCD elements, each of said elements having a corresponding charge time which changes when an external touch is applied to said element by a user;

means for selectively applying a charge to each of said LCD elements in said plurality;

means for monitoring a voltage across each of said LCD elements in said plurality and for using said voltage to compare said charge time of each of said LCD elements to a reference charge time value; and means, responsive to said means for monitoring, for determining which, if any, of said LCD elements in said plurality are currently being touched by a user, based on said comparison.

2. The system, as claimed in claim 1, wherein:

said plurality of LCD elements is a subset of a larger group of LCD elements arranged in rows and columns to form a display screen of said LCD system.

3. The system, as claimed in claim 2, wherein:

said plurality of LCD elements comprises a cursor image appearing on said display screen.

4. The system, as claimed in claim 2, wherein:

said plurality of LCD elements comprises a row of LCD elements in said display screen.

5. The system, as claimed in claim 1, wherein:

said means for monitoring includes means for comparing said voltage a cross each of said LCD elements in said plurality to a reference voltage and for creating an output signal indicative of the result of said comparison.

6. The system, as claimed in claim 5, wherein:

said means for monitoring further includes means for latching said output signal of said means for comparing in response to a strobe signal to create a charge time comparison signal.

7. The system, as claimed in claim 6, wherein:

said strobe signal is created based upon a time delay from the time said means for selectively applying a charge applies said charge to each of said LCD elements in said plurality.

8. The system, as claimed in claim 6, wherein:

said strobe signal is created based upon a first LCD element in said plurality exceeding said reference voltage.

9. The system, as claimed in claim 6, wherein:

said strobe signal latches said output signal of said means for comparing multiple times during a charging cycle to create weighted charge time data.

10. The system, as claimed in claim 6, wherein:

said strobe signal is created using a reference LCD element which is substantially shielded from external capacitive influence.

11. The system, as claimed in claim 5, wherein:

said means for monitoring further includes means for measuring the time period for which each element in said plurality has exceeded said reference voltage during a charging cycle and for creating an output signal indicative of said time period.

12. The system, as claimed in claim 1, wherein:

said means for determining includes means for receiving an output signal from said means for monitoring and means for processing said output signal to determine which of said LCD elements in said plurality is currently being touched by a user.

13. The system, as claimed in claim 12, wherein:

said means for processing is capable of rejecting errant data in said output signal.

14. The system, as claimed in claim 1, further comprising:

means for determining the center of said LCD elements in said plurality which are currently being touched by a user.

15. The system, as claimed in claim 1, further comprising:

means for recognizing user touch sequences and for converting said user touch sequences into corresponding input parameters to be used in computer applications.

16. The system, as claimed in claim 1, wherein:

said plurality of LCD elements are a part of an active matrix display which requires display voltages to be applied to said LCD elements in said plurality to create an image and which includes means for periodically reversing the polarity of said display voltages to prevent migration of liquid crystal molecules in said LCD elements; and said means for selectively applying a charge includes said means for periodically reversing the polarity of said display voltages.

17. The system, as claimed in claim 1, wherein:

said reference charge time value is adjustable.

18. The system, as claimed in claim 5, wherein:

said reference voltage is adjustable.

19. The system, as claimed in claim 1, wherein:

said means for selectively applying a charge includes means for selectively forcing each of said LCD elements in said plurality to a common voltage and means for selectively applying a predetermined charging voltage to each of said LCD elements in said plurality after said elements have reached said common voltage.

20. The system, as claimed in claim 19, wherein:

said means for selectively forcing includes means for grounding, said LCD elements for a discharge duration, T1, so that all of said elements attain a voltage of zero volts.

21. The system, as claimed in claim 20, wherein:
said discharge duration, T1, is adjustable.

22. The system, as claimed in claim 19, wherein:
said means for selectively forcing includes means for connecting selected LCD elements in said plurality together for a duration, T1, so that said selected LCD elements can come to a common voltage through charge sharing.

23. The system, as claimed in claim 19, wherein:
said means for selectively applying a predetermined charging voltage includes means for selectively applying said voltage for a charge duration, T2.

24. The system, as claimed in claim 23, wherein:
said charge duration, T2, is adjustable.

25. The system, as claimed in claim 23, wherein:
said charge duration, T2, is based upon a sensed voltage.

26. The system, as claimed in claim 23, wherein:
said charge duration, T2, is determined using a counter driven by a clock signal.

27. The system, as claimed in claim 19, wherein:
said means for selectively applying a predetermined charging voltage includes means for applying the same charging voltage to all of said LCD elements in said plurality.

28. The system, as claimed in claim 1, further comprising:
a stylus for use in touching said LCD elements, said stylus including means for transmitting data to a host computer; and
means, coupled to said host computer, for receiving said data from said stylus.

29. A liquid crystal display (LCD) system comprising:
a plurality of LCD elements, said LCD elements including:
    a front transparent plate having a first surface and a second surface, said first surface having a front electrode disposed adjacent thereto;
    a rear transparent plate positioned substantially parallel to, and in fixed relation to, said front transparent plate, said rear transparent plate having a rear electrode disposed adjacent to a first surface thereof, said first surface of said rear transparent plate facing said first surface of said front transparent plate so that said front electrode is substantially opposite said rear electrode; and
    a layer of liquid crystal material between said first surface of said front transparent plate and said first surface of said rear transparent plate, said layer capable of changing optical properties when a predetermined voltage is applied across said front and rear electrodes;
    wherein at least one of said LCD elements has a capacitance which chances when a user touches said second surface of said front transparent plate;
means for determining whether said second surface of said front transparent plate is being touched by a user based on said chance in capacitance; and
means, operatively connected to said front transparent plate, for increasing the change in capacitance of said LCD element when said second surface of said front transparent plate is touched by a user so that said means for determining is more sensitive to the touch of a user.

30. The system, as claimed in claim 29, wherein:
said means for increasing includes means for diffusing a conductive material into said front transparent plate in an area adjacent to said front electrode.

31. The system, as claimed in claim 29, wherein:
said means for increasing includes means for embedding said first electrode into said front transparent plate.

32. The system, as claimed in claim 29, wherein:
said means for increasing includes means for electrically coupling said front electrode and said second surface of said front transparent plate.

33. The system, as claimed in claim 29, wherein:
said means for increasing includes a conductive element fixed within said front transparent plate between said first surface and said second surface, said conductive element being electrically coupled to said front electrode.

34. In an LCD display system having a display screen including a plurality of LCD display elements arranged in rows and columns, said LCD system capable of displaying an image on said display screen by providing predetermined voltages to said LCD elements in said plurality, an apparatus for detecting the touch of a user on said display screen while an image is being displayed, said apparatus comprising:
    means for alternately charging and discharging said display elements in a subgroup of said plurality of display elements;
    means for comparing a charge time of each of said display elements in said subgroup to a reference charge time value; and
    means for processing the results of said comparison to determine which, if any, of said display elements in said subgroup are being touched;
    where in said LCD display elements in said plurality which are not in said subgroup continuously display an image on said display screen.

35. The apparatus, as claimed in claim 34, wherein:
said subgroup of display elements produce a cursor image on said display screen.

36. The apparatus, as claimed in claim 35, further comprising:
means for moving said cursor in response to movement of said touch on said display screen.

37. The apparatus, as claimed in claim 36, further comprising:
means for illuminating display elements which are traversed by said movement of said touch on said display screen.

38. The apparatus, as claimed in claim 34, wherein:
said subgroup of display elements corresponds to a row of display elements in said display screen.

39. The apparatus, as claimed in claim 38, further comprising:
means for periodically changing said row of said display elements in said display screen which corresponds to said subgroup so that every row of said display screen is periodically scanned.

40. The apparatus, as claimed in claim 34, wherein:
said display screen includes a diffused resistive material in the front glass providing alteration of segment charging when touched.

41. A method for sensing an external touch on a liquid crystal display (LCD), said method comprising the steps of:
    providing an array of LCD elements, each of said LCD elements having an associated charge time value which changes when an external touch is applied to a surface of said element;
    selectively applying a charge to each of said LCD elements in said array;
    comparing a charge time of each of said LCD elements to a reference charge time value; and
    determining whether one or more of said LCD elements in said array is being touched based on the results of said comparing step.

* * * * *